US006236414B1

(12) United States Patent
Suzuki et al.

(10) Patent No.: US 6,236,414 B1
(45) Date of Patent: May 22, 2001

(54) INK TRANSFER PRINTER

(75) Inventors: Katsuyoshi Suzuki, Tokyo; Minoru Suzuki, Tochigi; Mikio Horie; Hiroshi Orita, both of Saitama; Masahiko Sasaki, Chiba; Takemi Iwayama, Kanagawa, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/203,519

(22) Filed: Dec. 1, 1998

(30) Foreign Application Priority Data

Dec. 2, 1997 (JP) .................................................. 9-347128

(51) Int. Cl.[7] .................................................. G01D 15/16

(52) U.S. Cl. ......................... 346/140.1; 347/18; 347/189

(58) Field of Search .................................... 347/189, 194, 347/171, 18, 17, 5, 56, 185, 186; 400/120.14; 346/140.1

(56) References Cited

U.S. PATENT DOCUMENTS 4,490,728 * 12/1984 Vaught et al. ........................ 346/1.1
4,561,789 * 12/1985 Saito .................................... 400/120
5,512,924 * 4/1996 Takada et al. .......................... 347/18
5,800,075 * 9/1998 Katsuma et al. ...................... 400/120

* cited by examiner

*Primary Examiner*—John Barlow
*Assistant Examiner*—Blaise Mouttet
(74) *Attorney, Agent, or Firm*—Greenblum & Bernstein, P.L.C.

(57) ABSTRACT

An ink transfer printer has an electrically-insulated base plate. An array of electric heater elements, aligned with each other, is provided on a surface of the base plate, the heater elements being selectively and electrically energized in accordance with a series of digital image-pixel signals. A frame member, having an opening, is securely provided on the base plate such that the array of elements is encompassed by the opening of the frame member. A sheet of film covers the frame member such that the opening of the frame member is defined as an ink space fillable with ink, and the film sheet has a plurality of fine pores arranged along the array, with at least one of the plurality of fine pores being allocated to each of the heater elements. A heat dissipating conductor is formed of a thermal conductive material, and is associated with the film sheet such that thermal energy, locally generated by an electrical energization of at least one of the electric heater elements, is promptly dissipated.

8 Claims, 13 Drawing Sheets

INK TRANSFER PRINTER

BACKGROUND OF THE INVENTION

1. Field of the Invention

The present invention relates to an ink transfer printer, in which ink drops are selectively generated in accordance with a series of digital image-pixel signals, thereby producing ink dots on a sheet of recording paper.

2. Description of the Related Art

Conventionally, an ink jet printer is well known as a printer for producing ink dots on a sheet of recording paper by selectively generating ink drops in accordance with a series of digital image-pixel signals. Namely, the ink jet printer comprises an ink jet head which is formed with a plurality of nozzles for selectively emitting ink jets or ink drops in accordance with a series of digital image-pixel signals. Each of the nozzles is associated with a driver element, such as a piezoelectric element, and an emission of an ink jet from each nozzle is caused by electrically driving the piezoelectric element.

Generally, it is difficult to compactly construct the ink jet head. In particular, before a compact construction of the ink jet head can be obtained, the nozzles must be arranged so as to be in close proximity to each other. Nevertheless, with a compact arrangement of the nozzles, a distance between two adjacent nozzles must be greater than a given value, because it is necessary to prevent interference between the piezoelectric elements of the two adjacent nozzles, during the electrical energization thereof.

SUMMARY OF THE INVENTION

Therefore, an object of the present invention is to provide an ink transfer printer that selectively generates ink drops in accordance with a series of digital image-pixel signals, thereby producing ink dots on a sheet of recording paper, wherein an arrangement for the selective generation of the ink drops can be compactly constructed, and also a printing speed can be maximized.

In accordance with an aspect of the present invention, there is provided an ink transfer printer comprising: an electrically-insulated base member; an array of electric heater elements provided on a surface of the base member and aligned with each other, the electric heater elements being selectively and electrically energized in accordance with a series of digital image-pixel signals; a frame member, having an opening, securely provided on the base member such that the array of electric heater elements is encompassed by the opening of the frame member; a sheet of film that covers the frame member such that the opening of the frame member is defined as an ink space fillable with ink, the film sheet including a plurality of fine pores arranged along the array of electric heater elements; and a heat dissipating conductor, formed of a thermal conductive material, and that is associated with the film sheet such that thermal energy, locally generated by an electrical energization of at least one of the electric heater elements, is promptly dissipated.

The heat dissipating conductor may be formed as a heat dissipating sheet having an opening. In this case, the heat dissipating conductor or sheet is preferably interposed between the frame member and the film sheet such that the plurality of fine pores is encompassed by the opening of the heat dissipating sheet. Also, the heat dissipating conductor may be formed as a heat dissipating strip. In this case, the heat dissipating conductor or strip is preferably attached to an inner surface of the film sheet in the ink space.

The heat dissipating conductor may exhibit an electrical conductivity such that the film sheet is heatable by electrically energizing the heat dissipating conductor. In this case, preferably, the ink transfer printer further comprises a control system that controls the electrical energization of the heat dissipating conductor such that a temperature of the film sheet is kept constant, and an interrupting system that interrupts the electrical energization of the heat dissipating conductor over a predetermined period of time after the electrical energization of at least one of the electric heater elements ends.

In accordance with another aspect of the present invention, there is provided an ink transfer printer comprising: an electrically-insulated base member; an array of electric heater elements provided on a surface of the base member and aligned with each other, the electric heater elements being selectively and electrically energized in accordance with a series of digital image-pixel signals; a thermal conductive frame member, having an opening, securely provided on the base member such that the array of electric heater elements is encompassed by the opening of the frame member; and a sheet of film that covers the thermal conductive frame member such that the opening of the thermal conductive frame member is defined as an ink space filled with ink, the film sheet including a plurality of fine pores arranged along the array of electric heater elements.

The thermal conductive frame member may exhibit an electrical conductivity such that the film sheet is heatable by electrically energizing the thermal conductive frame member. In this case, preferably, the ink transfer printer further comprises a control system that controls the electrical energization of the thermal conductive frame member such that a temperature of the film sheet is kept constant, and an interrupting system that interrupts the electrical energization of the thermal conductive frame member over a predetermined period of time after the electrical energization of at least one of the electric heater elements ends.

BRIEF DESCRIPTION OF THE DRAWINGS

The object and other objects of this invention will be better understood from the following description, with reference to the accompanying drawings in which.

DESCRIPTION OF THE PREFERRED EMBODIMENTS

Figure 1:
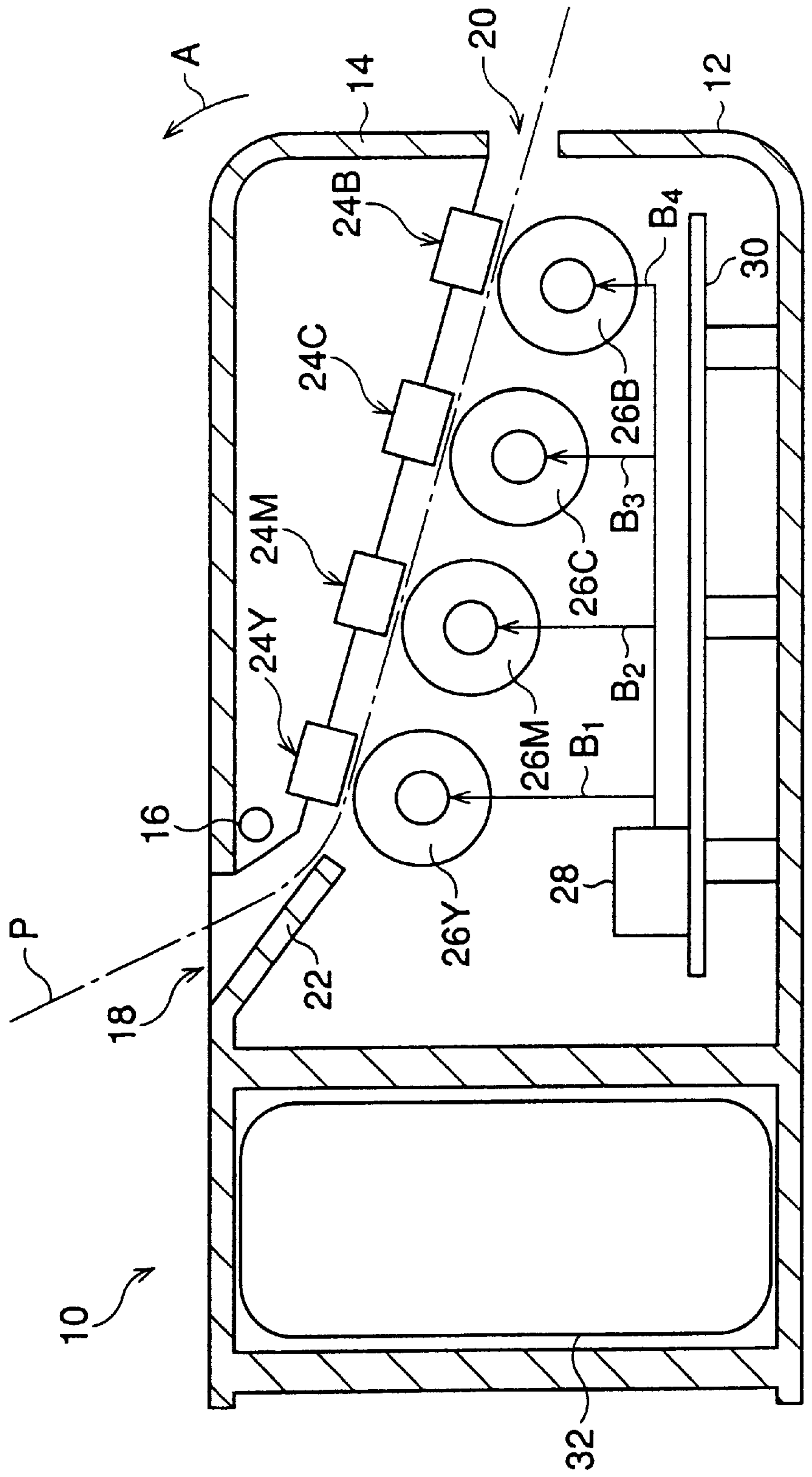
FIG. 1 is a schematic longitudinal-sectional view showing an ink transfer printer, according to a first aspect of the present invention.

FIG. 1 schematically shows an embodiment of an ink transfer printer, generally indicated by reference numeral 10, according to the present invention, which is constituted as a line printer so as to form a color image on a sheet of recording paper.

The ink transfer printer 10 comprises a rectangular parallelepiped housing 12, and a movable cover 14 rotatably attached to the housing 12 at a pivot pin 16 securely fixed to the housing 12. The movable cover 14 is usually positioned and latched at a closed position as shown in FIG. 1, but the movable cover 14 may be unlatched and rotated in a direction indicated by an arrow A to an open position, for example, to allow maintenance to the printer.

When the movable cover 14 is at the closed position, the housing 12 in conjunction with the movable cover 14 defines an entrance opening 18 and an exit opening 20, and a path for movement of a sheet of recording paper, indicated by a chained line P, is defined between the housing 12 and the movable cover 14. The housing 12 is provided with a guide plate 22 defining a part of the path P, and the recording paper sheet is introduced into the entrance opening 18 along the guide plate 22, and is then discharged from the exit opening 20 after formation of a color image on the recording paper sheet.

The printer 10 comprises four ink transfer printer units 24Y, 24M, 24C and 24B, supported by the movable cover 14 and arranged along the path P when the movable cover 14 is closed, and four roller platens 26Y, 26M, 26C and 26B provided in the housing 12 and associated with the printer units 24Y, 24M, 24C and 24B, respectively. These printer units 24Y, 24M, 24C and 24B are substantially identical to each other, as are the roller platens 26Y, 26M, 26C and 26B. Each of the roller platens 26Y, 26M, 26C and 26B may be formed of a suitable rubber material.

The printer unit 24Y is used to form a yellow image on the recording paper sheet with yellow ink, when the recording paper sheet becomes engaged at a nip between the printer unit 24Y and the roller platen 26Y; the printer unit 24M is used to form a magenta image on the recording paper sheet with magenta ink, when the recording paper sheet becomes engaged at a nip between the printer unit 24M and the roller platen 26M; the printer unit 24C is used to form a cyan image on the recording paper sheet with cyan ink, when the recording paper sheet becomes engaged at a nip between the printer unit 24C and the roller platen 26C; and the printer unit 24B is used to form a black image on the recording paper sheet with black ink, when the recording paper sheet becomes engaged at a nip between the printer unit 24B and the roller platen 26B.

The printer 10 is provided with an electric motor 28, such as a stepping motor, a servo motor, or the like, and the roller platens 26Y, 26M, 26C and 26B are rotationally and synchronously driven through a suitable power transmission mechanism, such as a gear transmission arrangement, a toothed belt/pulley arrangement, or the like, representatively shown by arrowheaded lines $B_1$, $B_2$, $B_3$ and $B_4$ in FIG. 1. Preferably, one of two adjacent roller platens, being placed further downstream of the movement of the recording paper sheet, is given a peripheral speed somewhat higher than that of the other roller platen, being placed upstream of the movement of the recording paper sheet, such that the recording paper sheet is under tension during movement between the nips of the respective printer units 24Y, 24M, 24C and 24B and roller platens 26Y, 26M, 26C and 26B.

Note, in FIG. 1, reference 30 indicates a control circuit board for controlling a printing operation of the color printer, and reference 32 indicates an electrical main power source for electrically energizing the control circuit board 30.

Figure 2:
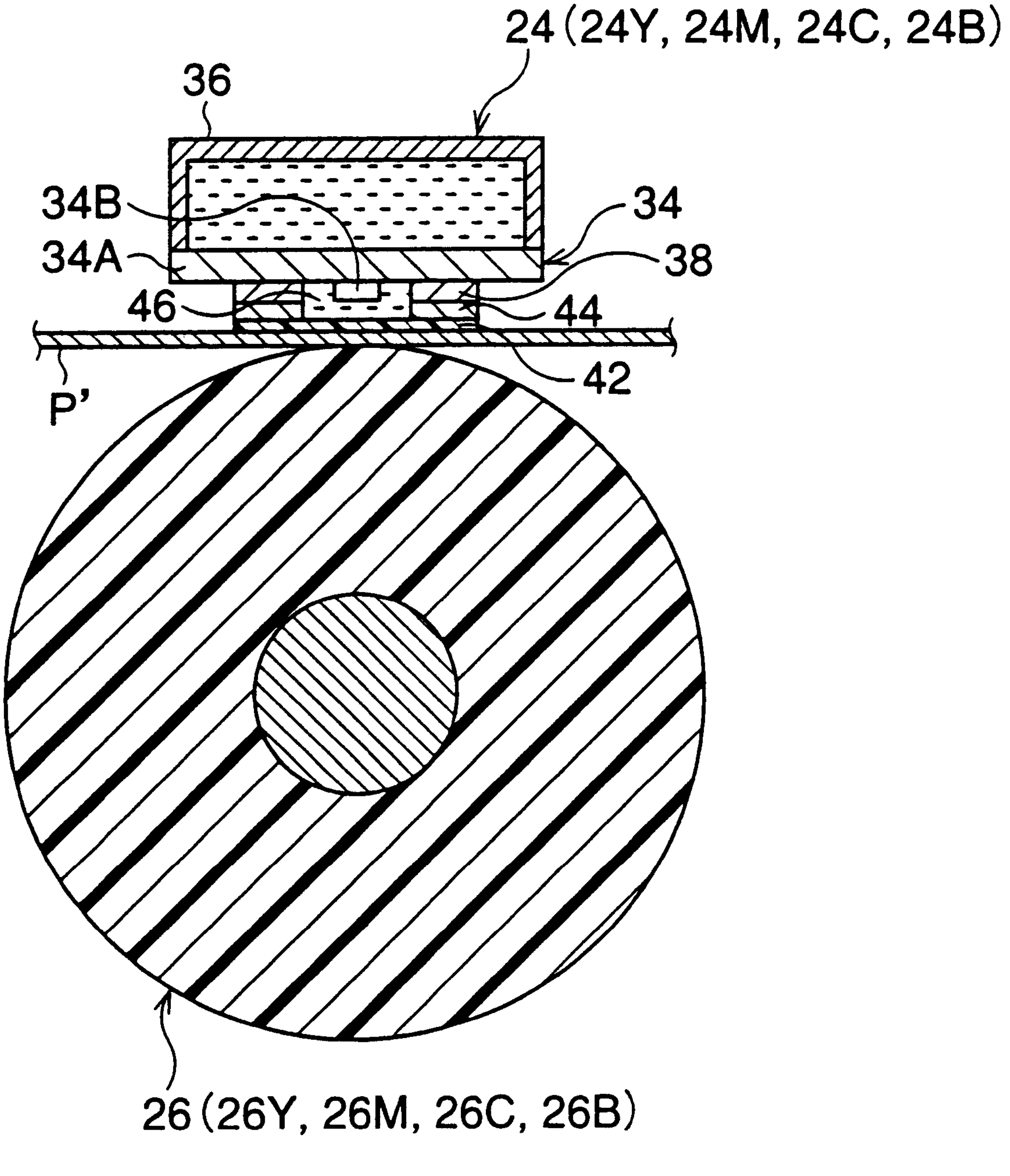
FIG. 2 is a schematic cross-sectional view representatively showing one of four ink transfer printer units, together with a roller platen associated therewith, incorporated in the ink transfer printer shown in FIG. 1.

FIG. 2 shows a set of printer unit 24 and a roller platen 26, which represent one of the printer units 24Y, 24M, 24C and 24B and one of the roller platens 26Y, 26M, 26C and 26B, respectively.

Figure 3:
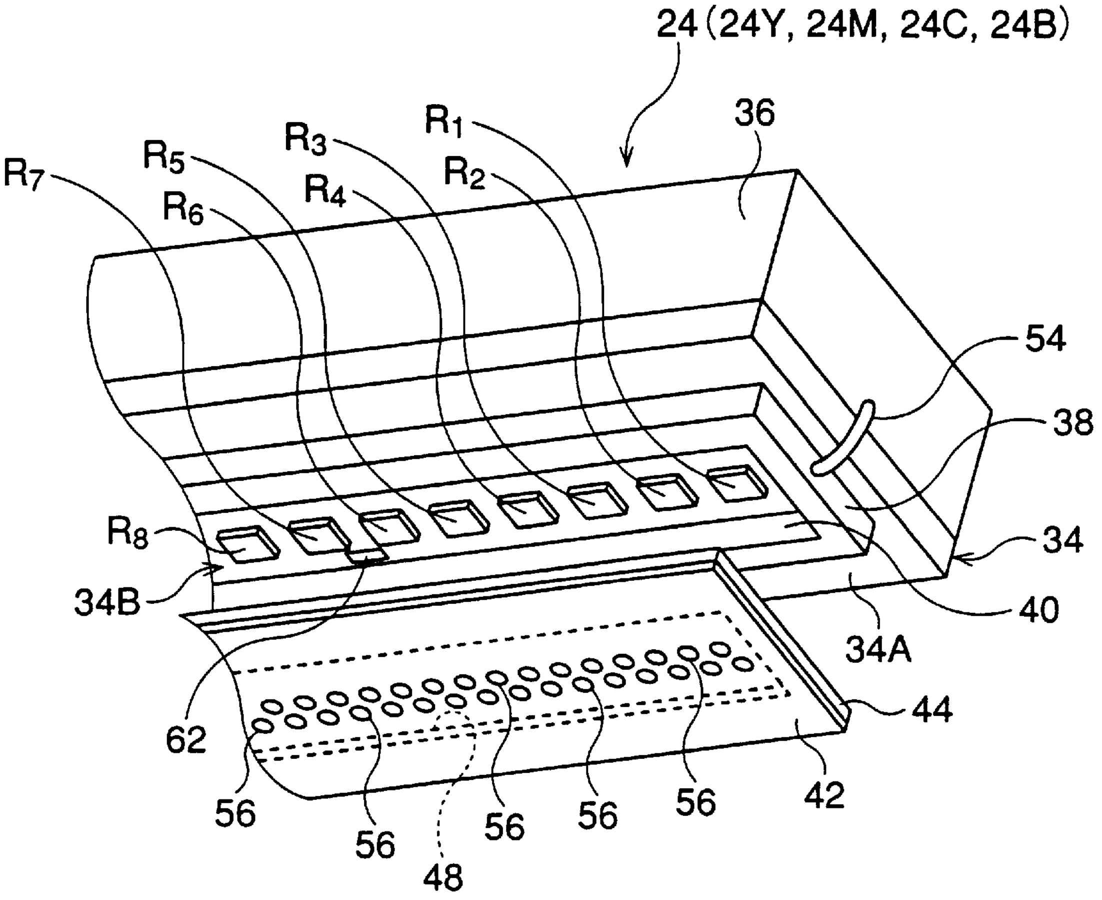
FIG. 3 is a schematic perspective exploded view partially showing the ink transfer printer unit.

The printer unit 24 is provided with a thermal head 34 including an elongated rectangular base plate 34A formed of, for example, a suitable ceramic material, and an array 34B of heater elements longitudinally aligned on a lower surface of the base plate 34A. As best shown in FIG. 3, the array 34B of heater elements comprises n heater elements $R_n$ (where n=1, 2, 3, 4, 5, . . . ), with only a part of the total number of n heater elements $R_n$ being indicated by references $R_1$ to $R_8$. Note, each of the heater elements $R_n$ is formed as an electric resistance element.

Also, the printer unit 24 is provided with a box-like ink container 36 associated with the thermal head 34 such that the ink container 36 is provided on a upper surface of the base plate 34A. The ink container 36 contains one of yellow ink, magenta ink, cyan ink and black ink. For example, when the printer unit 24 is used as the printer unit 24Y for the formation of a yellow image, the container 36 is charged with yellow ink.

As shown in FIGS. 2 and 3, an elongated rectangular frame member 38, which is formed with an elongated rectangular opening 40, is securely attached to the lower surface of the base plate 34A such that the array of heater elements 34B is encompassed by the rectangular opening 40 of the frame member 38. The frame member 38 is formed of an electrical insulation material, such as a suitable synthetic resin.

Also, a sheet of film 42, having a heat dissipating conductor 44, is securely adhered to the frame member 38 such that the rectangular opening 40 is covered with the film sheet 42, thereby defining an ink space 46 (FIG. 2). In this embodiment, the heat dissipating conductor 44 is preferably formed of a suitable metal sheet exhibiting good thermal conductivity, such as an aluminum sheet, a copper sheet, or the like, and is shaped into an elongated rectangular frame-like element having a rectangular opening 48 (FIG. 3), similar to the frame member 38 having the rectangular opening 40. In short, the heat dissipating conductor or sheet 44 is interposed between the frame member 38 and the film sheet 42, as shown in FIG. 2.

There may be a gap of about 0.1 mm between the film sheet 42 and the lower surface of the base plate 34A, and the film sheet 42 may have a thickness of about 0.03 to about 0.08 mm. Preferably, the film sheet 42 is formed of a suitable synthetic resin, exhibiting moderate elasticity, a wear-resistant property and a heat-resistant property. For example, polytetrafluoroethylene can be advantageously used for the film sheet 42.

Figure 4:
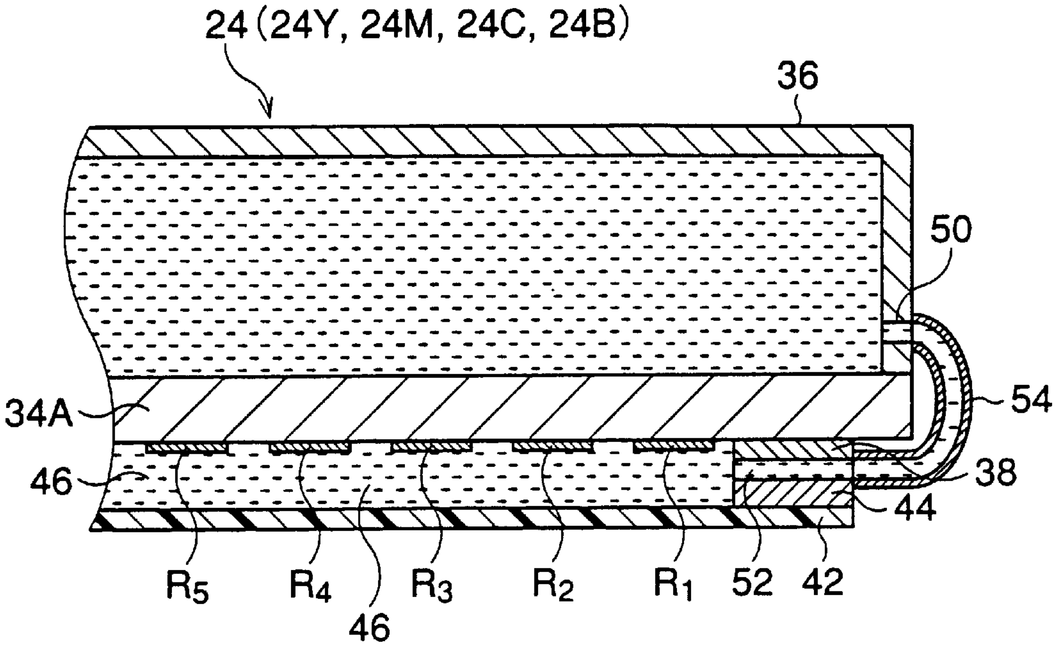
FIG. 4 is a schematic longitudinal-sectional view partially showing the ink transfer printer unit.

As shown in FIG. 4, the ink container 36 has a spout 50 formed in an end wall thereof, and the frame member 38 has an inlet passage 52 formed in an end portion thereof, the spout 50 and the passage 52 are connected to each other by an ink supply pipe 54. Namely, the ink space 46 is in communication with the ink container 36 via the ink supply pipe 54, and thus the ink space 46 is fed and filled with the ink from the ink container 36.

As further shown in FIG. 3, the film sheet 42 is provided with a plurality of microscopic pores 56 formed therein. In this embodiment, the pores 56 are aligned with each other in two rows, and the two rows of pores 56 extend above the alignment of heater elements $R_n$, and at least two of the plurality of fine pores 56 are allocated to and associated with each of the electric heater elements $R_n$. If the pores 56 are aligned with each other in one row, at least one of the plurality of pores 56 may be allocated to each of the electric heater $R_n$. Note, the microscopic pores 56 are exaggeratively illustrated in FIG. 3.

The film sheet 42, having the microscopic pores 56, is produced, for example, as follows:

Initially, a blank sheet of film is omnidirectionally pulled so as to be elastically expanded, and is then pierced by fine needles or fine laser beams, such that a plurality of pores (56) is formed in the blank film sheet. Thereafter, the pierced film sheet is released from the pulling forces, and is then trimmed or shaped as the film sheet 42 with the microscopic pores 56.

Note, when the pierced film sheet is released from the pulling forces, the microscopic pores 56 usually elastically close, so that the ink, held in the ink space 46, cannot permeate and penetrate through the pores 56.

Figure 5:
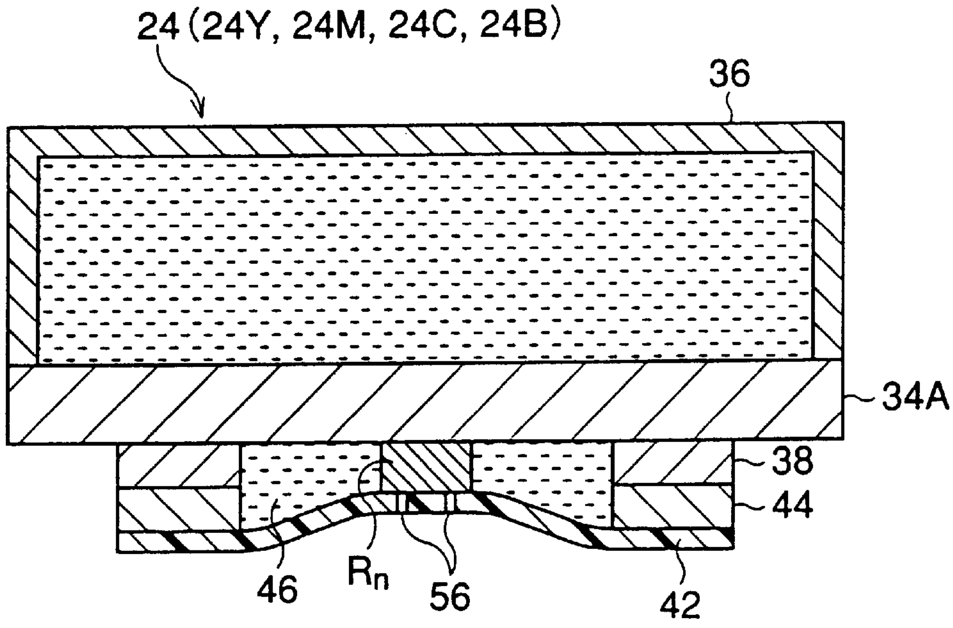
FIG. 5 is a schematic enlarged cross-sectional view of the ink transfer printer unit for explaining a principle of an ink transfer printing operation according to the present invention.
Figure 6:
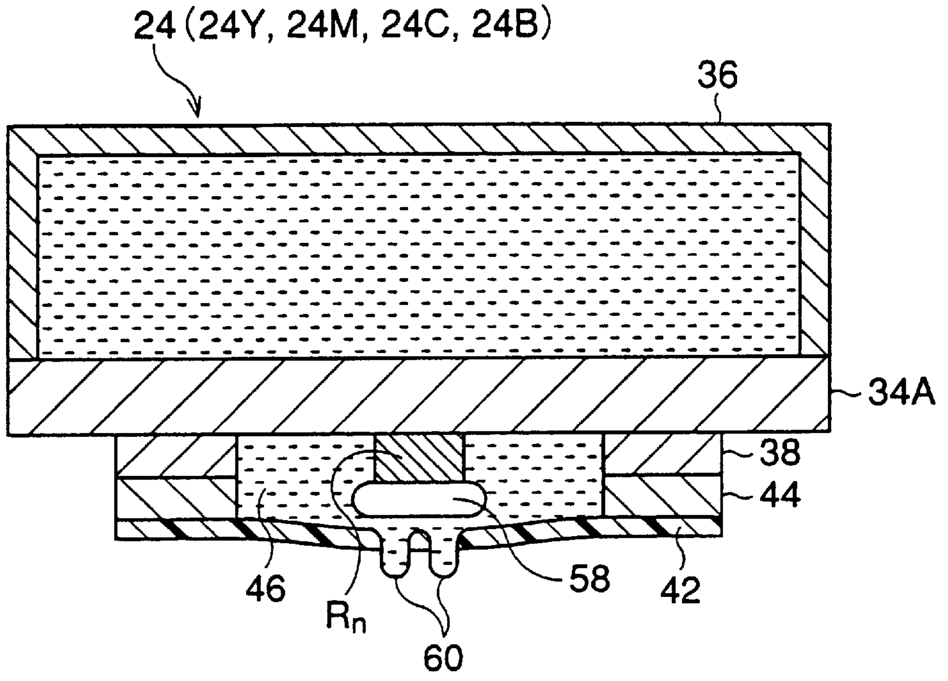
FIG. 6 is a schematic enlarged cross-sectional view, similar to FIG. 5, showing the ink transfer printer unit concerned during the ink transfer printing operation.

With reference to FIGS. 5 and 6, a principle of a printing operation, as performed by the printer unit 24 according to the present invention, is conceptually illustrated.

An elongated central area of the film sheet 42, in which the pores 56 are formed, is usually located in extremely close proximity to the electric heater elements $R_n$, or is in actual contact with the heater elements $R_n$, as shown in FIG. 5. When one of the electric heater elements $R_n$ is heated by an electrical energization thereof, the electric heater element concerned is heated to a predetermined temperature.

Thus, a part of the ink, in contact with the heated heater element $R_n$ is vaporized, thereby producing a bubble 58, as shown in FIG. 6. Also, a local area of the film sheet 42, corresponding to the heated heater element $R_n$, is heated so that a modulus of elasticity of the heated local area is decreased. As a result, the heated local area of the film sheet 42 inflates due to the decrease in the modulus of elasticity thereof and due to the vapor pressure generated in the bubble 58. Further, a part of the ink, pressurized by the vapor pressure, can penetrate and permeate through the pores 56, which are included in the inflated local area of the film sheet 42, and thus these pores 56 are widened.

Accordingly, the permeated and penetrated ink appears as fine ink drops 60 on the inflated local area, corresponding to the heated heater element $R_n$, of the film sheet 42, as shown in FIG. 6. As shown in FIG. 2, a sheet of recording paper, indicated by reference P', is interposed between the film sheet 42 and the platen roller 26, the fine ink drops 60 are transferred to the paper sheet P', and the transferred fine ink drops 60 produce a single dot on the paper sheet P'. The transfer of the ink drops 60 to the paper sheet P' should be completely performed, because, if a part of each ink drop is left on the film sheet 42, the paper sheet P' is stained or smudged with the remaining ink. The film sheet 42, formed of polytetrafluoroethylene, exhibits a high transferability of a liquid ink to the sheet of recording paper P'.

Of course, a size (diameter) of the single dot depends on a number of the microscopic pores 56 included in the local area of the film sheet 42, a pierced size of each pore 56, a temperature reached by the heated heater element $R_n$, and so on. Note, the size of the single dot may be about 50 $\mu$m to about 100 $\mu$m.

When the electrical energization of the heater element $R_n$ concerned is stopped, the bubble 58 condenses and the heated and inflated local area of the film sheet 42 is cooled by the surrounding ink held in the ink space 46, such that thermal energy, locally generated by the energization of the heater element $R_n$, is sufficiently dissipated, leading to a return to the original condition, as shown in FIG. 5.

In short, by selectively and electrically energizing the electric heater elements $R_n$, based on a series of digital image-pixel signals, it is possible to record and print images on the recording paper sheet P' (FIG. 2).

Before a printing speed of the ink transfer printer 10 can be increased, and before a produced dot can always have a predetermined constant size, it is necessary to promptly dissipate the thermal energy locally generated by the electrical energization of one of the heater elements $R_n$.

Figure 7:
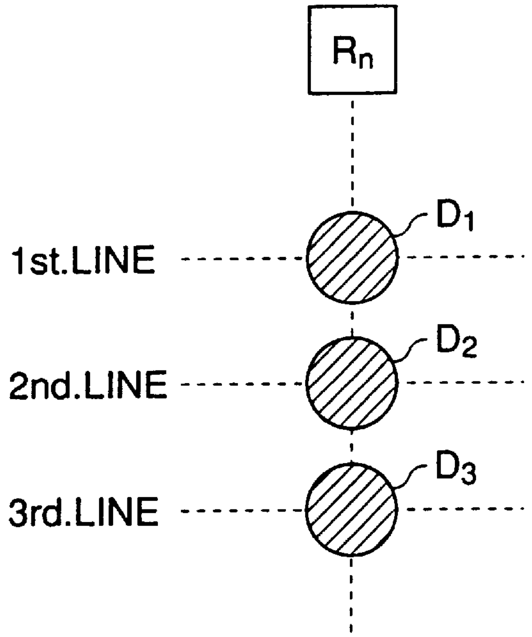
FIG. 7 is a conceptual view to aid in an explanation of a production of three ink dots by three consecutive energizations of a heater element in the ink transfer printer unit over suitable intervals of time.

In particular, for example, as conceptually shown in FIG. 7, when an electrical energization of a heater element ($R_n$) concerned is consecutively performed three times such that three dots $D_1$, $D_2$ and $D_3$ are produced on the first, second and third lines, respectively, an interval between two consecutive electrical energizations should be set such that remaining thermal energy, locally generated during the preceding electrical energization, is sufficiently dissipated, thereby ensuring that all of the three dots $D_1$, $D_2$ and $D_3$ will be produced with substantially a same size.

Figure 8:
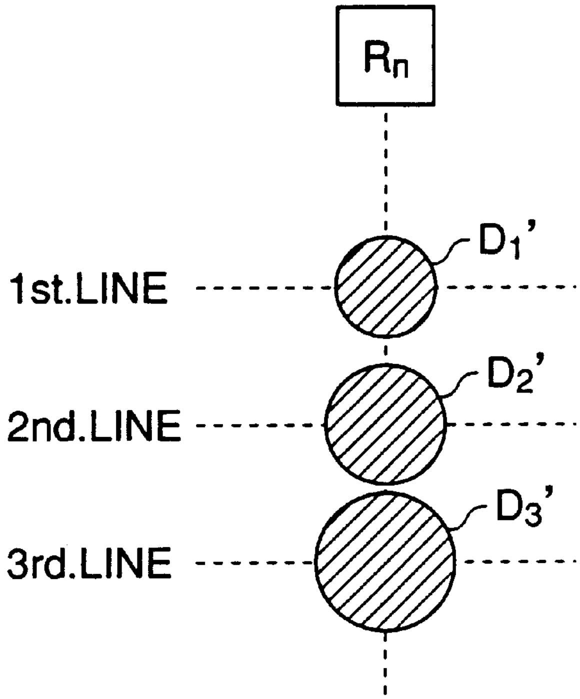
FIG. 8 is a conceptual view to aid in an explanation of a production of three ink dots by three consecutive energizations of a heater element in the ink transfer printer unit over unsuitable intervals of time.

If the interval between the consecutive electrical energizations is too short, i.e. if the energization is performed before the thermal remaining energy, locally generated during the preceding energization, is sufficiently dissipated, three dots $D_1'$, $D_2'$ and $D_3'$, having different sizes, may be produced on the first, second and third lines, respectively, as conceptually shown in FIG. 8, due to an accumulation effect of undissipated thermal energy, generated by the consecutive energizations of the heater element concerned, in an immediate area surrounding the heater element concerned. Namely, a rise in temperature of the local area of the film sheet 42 corresponding to the area of undissipated heat energy, occurs, resulting in the formation of dots $D_1'$, $D_2'$ and $D_3'$.

According to the above-mentioned embodiment, it is possible to shorten the interval between the consecutive energizations of the heater element ($R_n$) concerned, because rapid dissipation of the thermal energy occurs due to the existence of the heat dissipating sheet 44, interposed between the frame member 38 and the film sheet 42, and thus the printing speed of the ink transfer printer 10 can be increased.

Figure 9:
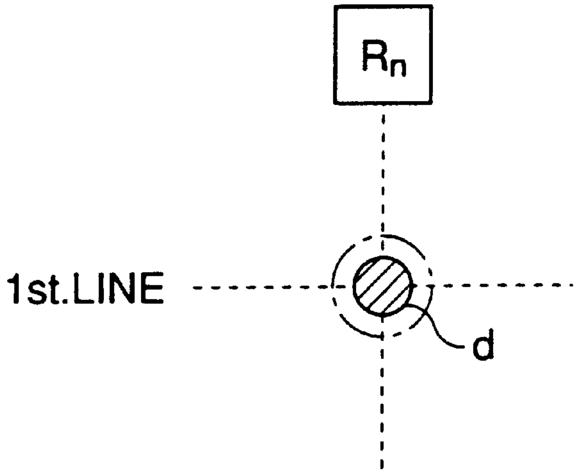
FIG. 9 is a conceptual view to aid in an explanation of a production of an under-sized ink dot during a low ambient temperature conditions.

On the other hand, in the printer unit 24 as mentioned above, a size of a produced dot also depends on an ambient temperature at which the ink transfer printer 10 operates. For example, when the ambient temperature is low as in a winter season, the ink, held in the ink space 46, also exhibits a low temperature. Accordingly, a local area of the film sheet 42, corresponding to a heated heater element ($R_n$) concerned, cannot be sufficiently heated, and thus the heated heater element ($R_n$) merely produces a under-sized dot d, as conceptually shown in FIG. 9, in which a proper dot size of a dot that should be regularly produced is indicated by a single-chained line circle. Of course, this is due to the modulus of elasticity of the heated local area of the film sheet 42 not being sufficiently decreased.

To maintain a constant temperature of the ink in the ink space 46 (and therefore, the film sheet 42), thus enabling production of a dot having a predetermined constant size, the heat dissipating sheet 44 can be dual-purposely utilized as an electric heater. In particular, when the temperature of the film sheet 42 is lower than a predetermined threshold value, the ink in the ink space 46 is heated by electrically energizing the heat dissipating sheet 44, and the electrical energization of the heat dissipating sheet 44 is interrupted by the film sheet 42 reaching to the predetermined threshold value.

In this embodiment, to detect a temperature of the ink in the ink space 46 (and therefore, the film sheet 42), four thermal sensors, each of which may be a thermistor, are provided on the lower surface of the base plate 34A along the array 34B of heater elements $R_n$ at regular intervals. Note, in FIG. 3, only one of the four thermal sensors, indicated by reference numeral 62, is illustrated.

Figure 10:
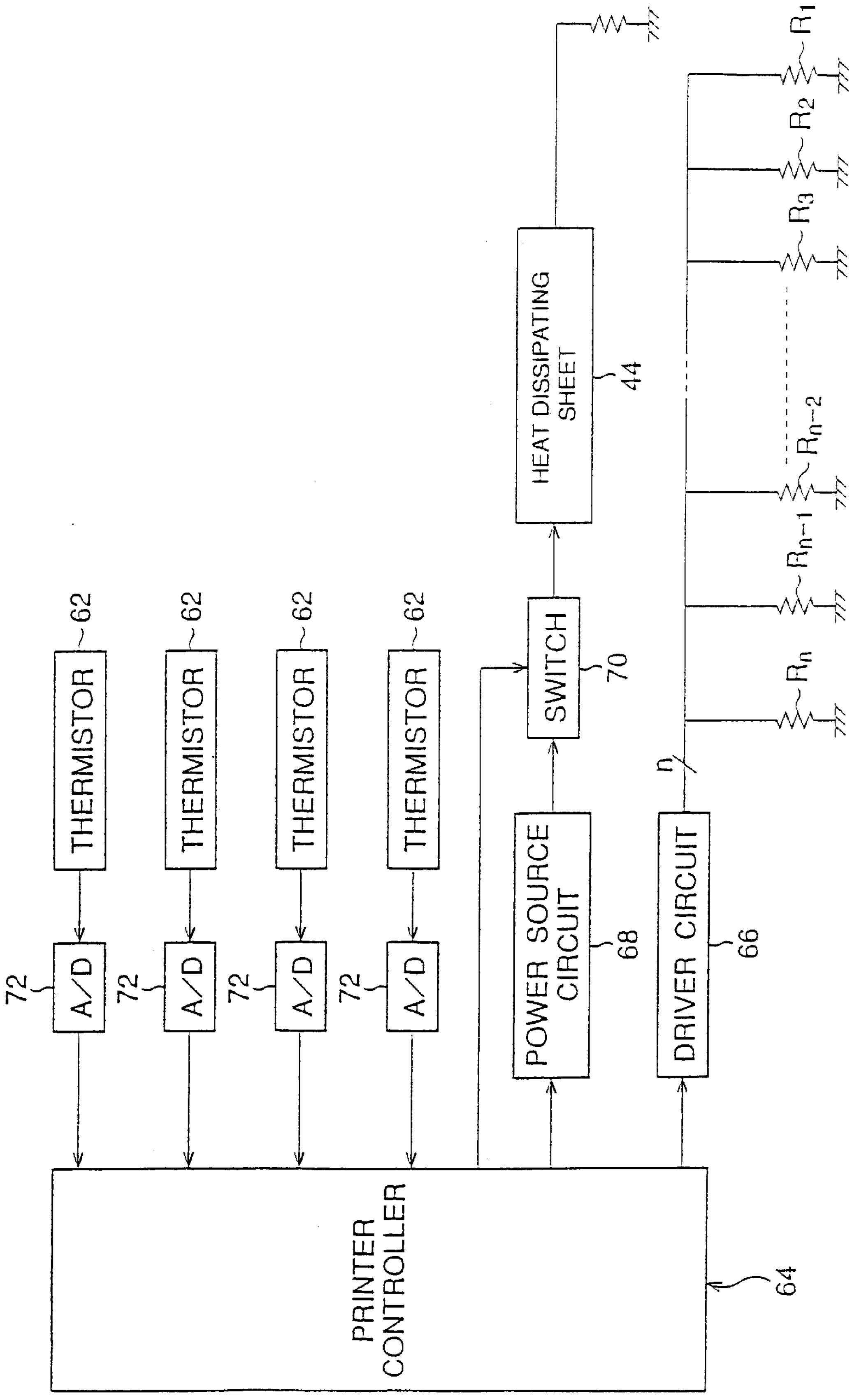
FIG. 10 is a schematic block diagram of the ink transfer printer unit.

FIG. 10 shows a schematic block diagram of the printer unit 24. As shown in this drawing, the printer unit 24 comprises a printer controller 64, which is constituted as a microcomputer including, for example, a central processing unit (CPU), a read-only memory (ROM), a random-access-memory (RAM), and an input/output interface (I/O).

As is apparent from FIG. 10, the heater elements $R_n$ are connected to a driver circuit 66, and the driver circuit 66 is operated under control of the printer controller 64, such that the heater elements $R_n$ are selectively and electrically energized in accordance with a series of digital image-pixel signals in substantially the same manner as in a conventional thermal head.

The heat dissipating sheet 44 is connected to a power source circuit 68 through a switch 70, and the power source circuit 68 and the switch 70 are controlled by the printer controller 64, such that the heat dissipating sheet 44 is electrically energized by the power source circuit 68 only while the switch 70 is turned ON. The ON/OFF operation of the switch 70 is performed on the basis of temperatures detected by the four thermal sensors or thermistors 62. In particular, as shown in FIG. 10, each of the four thermistors 62 is connected to an analog-digital (A/D) convertor 72, and the temperature, detected by each thermistor 62, is retrieved as a temperature data from the corresponding A/D convertor 72 by the printer controller 64.

Figure 11:
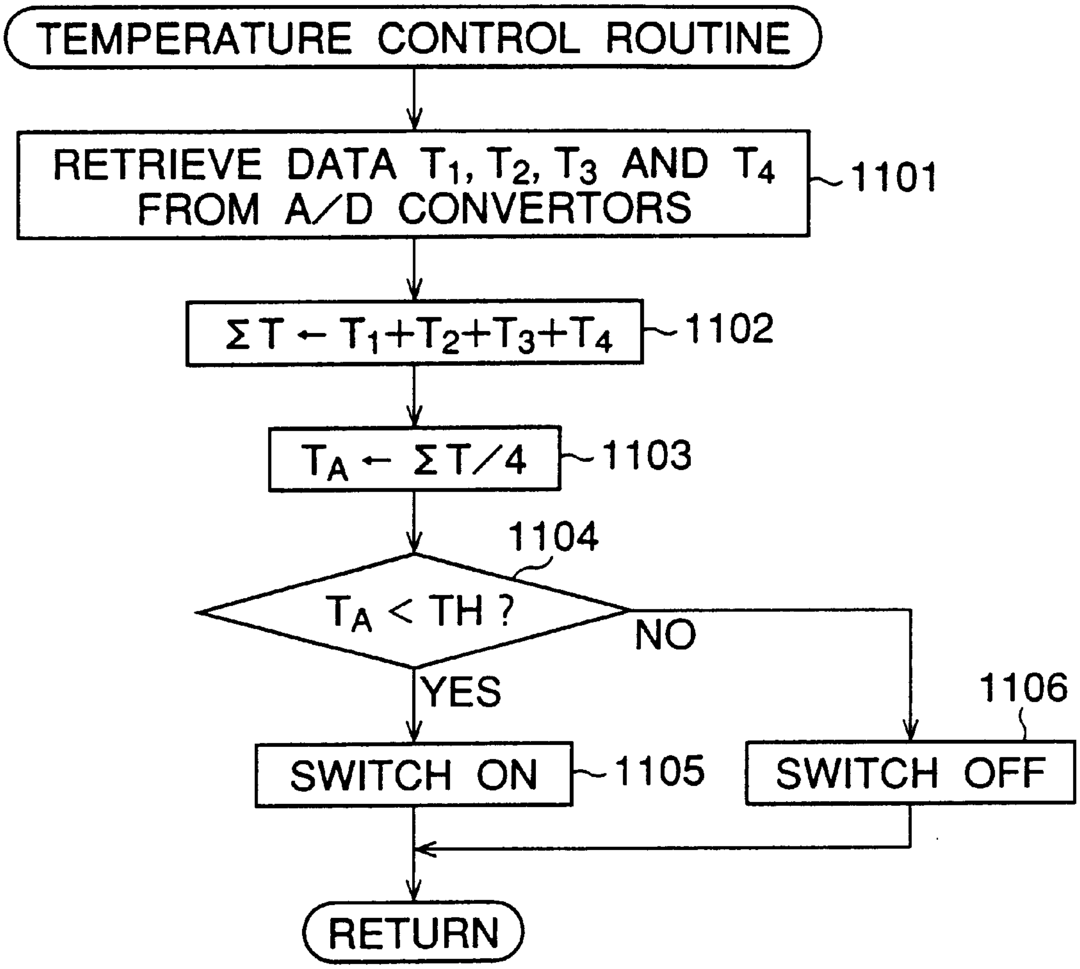
FIG. 11 is a flowchart showing a temperature control routine executed in a printer controller shown in FIG. 10.

FIG. 11 shows a flowchart for a temperature control routine, which is a time interruption routine executed at intervals of, for example, 100 ms in the printer controller 64. Note, the execution of the temperature control routine is commenced by the turning ON of a power switch (not shown) of the ink transfer printer 10.

At step 1101, temperature data $T_1$, $T_2$, $T_3$ and $T_4$ are retrieved from the four A/D convertors 72, respectively. Of course, each of the temperature data $T_1$, $T_2$, $T_3$ and $T_4$ is derived from an ambient temperature detected by the corresponding thermistor 62, and represents a temperature of the ink held in the ink space 46.

At step 1102, the following calculation is executed:

$$\Sigma T \leftarrow T_1+T_2+T_3+T_4$$

Namely, the sum $\Sigma T$ of the temperature data $T_1$, $T_2$, $T_3$ and $T_4$ is calculated.

Then, at step 1103, the following calculation is executed:

$$T_A \leftarrow \Sigma T/4$$

Namely, the average temperature $T_A$ of the temperature data $T_1$, $T_2$, $T_3$ and $T_4$ is calculated.

At step 1104, it is determined whether the average temperature $T_A$ is less than a predetermined threshold value TH. If $T_A \leqq TH$, the control proceeds to step 1105, in which the switch 70 is turned ON so that the heat dissipating sheet 44 is electrically energized, thereby heating the ink held in the ink space 46. If $T_A > TH$, the control proceeds to step 1106, in which the switch 70 is turned OFF so that the electrical energization of the heat dissipating sheet 44 is interrupted. Thus, the temperature of the ink in the ink space 46 is maintained at a constant temperature, thereby ensuring production of a dot, having a predetermined constant size, by any one of the heater elements $R_n$.

Figure 12:
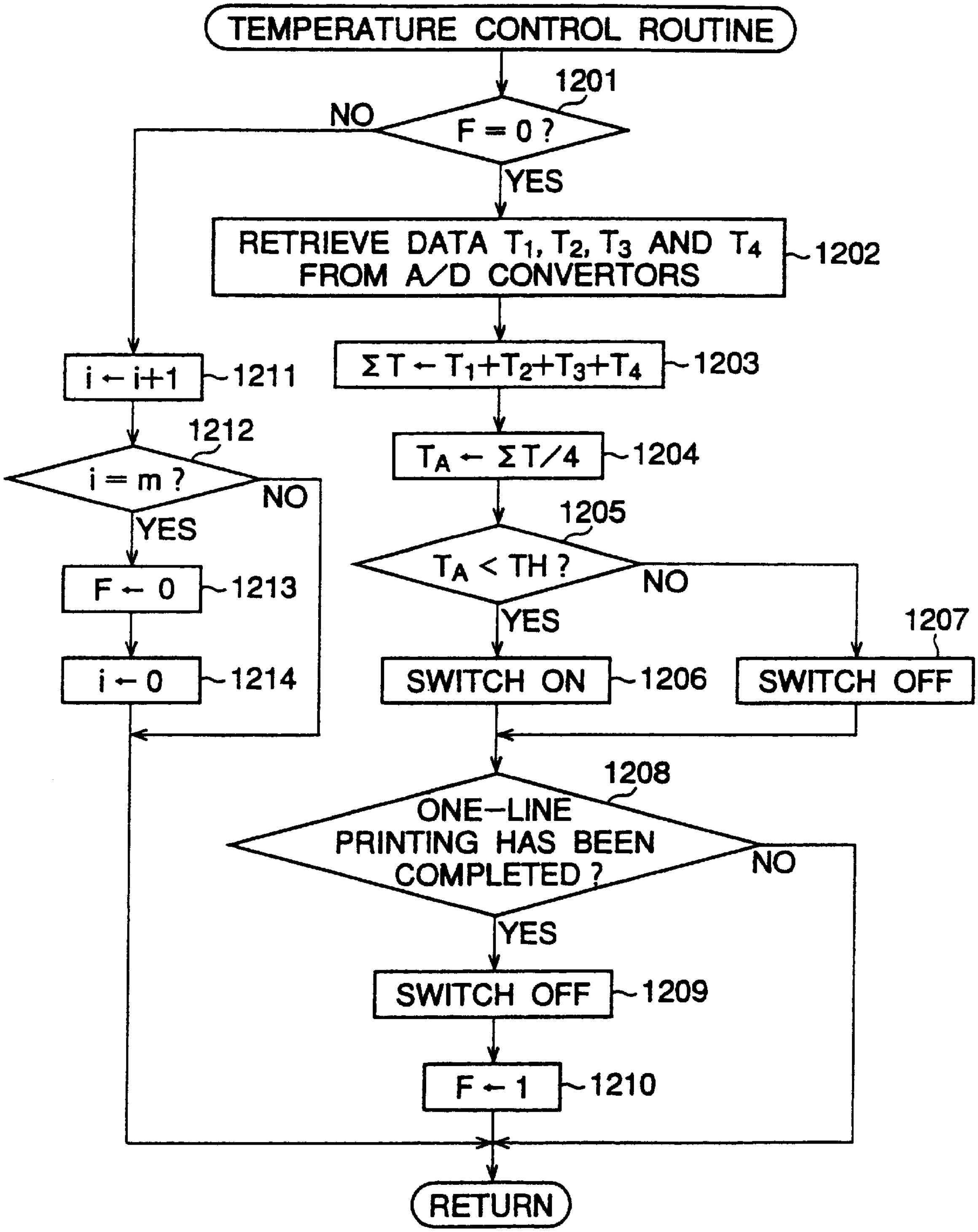
FIG. 12 is a flowchart showing another temperature control routine executed in the printer controller shown in FIG. 10.

FIG. 12 shows a flowchart for a modification of the temperature control routine shown in FIG. 11. In this modified routine, just after a printing of one line, by the array 34B of heater elements $R_n$, ends, the switch 70 is turned OFF for a predetermined period of time, so that thermal energy, generated by selective energizations of the heater elements $R_n$, is more rapidly dissipated due to no electrical energization of the heat dissipating sheet 44.

At step 1201, it is determined whether a flag F is "0" or "1". At an initial stage, since F=0, the control proceeds to step 1202, in which respective temperature data $T_1$, $T_2$, $T_3$ and $T_4$ is retrieved from the four A/D convertors 72.

At step 1203, the sum $\Sigma T$ of the temperature data $T_1$, $T_2$, $T_3$ and $T_4$ is calculated, and then, at step 1204, the average temperature $T_A$ of the temperature data $T_1$, $T_2$, $T_3$ and $T_4$ is calculated.

At step 1205, it is determined whether the average temperature $T_A$ is less than a predetermined threshold value TH. If $T_A \leqq TH$, the control proceeds to step 1206, in which the switch 70 is turned ON so that the heat dissipating sheet 44 is electrically energized, thereby heating the ink held in the ink space 46. If $T_A > TH$, the control proceeds to step 1207, in which the switch 70 is turned OFF so that the electrical energization of the heat dissipating sheet 44 is interrupted.

In either case, the control proceeds to step 1208, in which it is determined whether, at this point in time, a one-line printing has just been completed by the array 34B of heater elements $R_n$. If the printing of one line has not been completed, the routine is once finished. Namely, in this case, the temperature of the ink in the ink space 46 is maintained at a constant temperature, similarly to the routine shown in FIG. 11.

At step 1208, if the one-line printing has just ended, the control proceeds to step 1209, in which the switch 70 is turned OFF. Then, at step 1209, the flag F is made to be "1".

After 100 ms, the routine is again executed, the control proceeds from step 1201 to 1211 (F=1), in which a count number of a counter i is incremented by "1". Note, the count number of the counter i is initially set to be "0". Then, at step 1212, it is determined whether the counter number of the counter i has reached an integer "m". If the counter number has not reached the integer "m", the routine is once finished.

Thereafter, although the execution of the routine is repeated at intervals of 100 ms, the count number of the counter i is merely incremented one by one. At step 1212, if the count number of the counter i has reached the integer "m", the control proceeds from 1212 to step 1213, in which the flag F is made to be "0". Then, at step 1214, the counter i is reset. Thereafter, the temperature control of the ink in the ink space 46 is performed in the above-mentioned manner.

Note, the integer "m" may be suitably selected. For example, if it is desired that the electrical energization of the heat dissipating sheet 44 is interrupted over a period of one second just after the printing of one line ens, the integer "m" is given a setting of "10".

In short, according to the temperature control routine shown in FIG. 12, it is possible to more rapidly dissipate thermal energy, generated by selective energizations of the heater elements $R_n$, due to none electrical energization of the heat dissipating sheet 44 for the period of time corresponding to the integer "m", which can be accurately and optimumly set.

Figure 13:
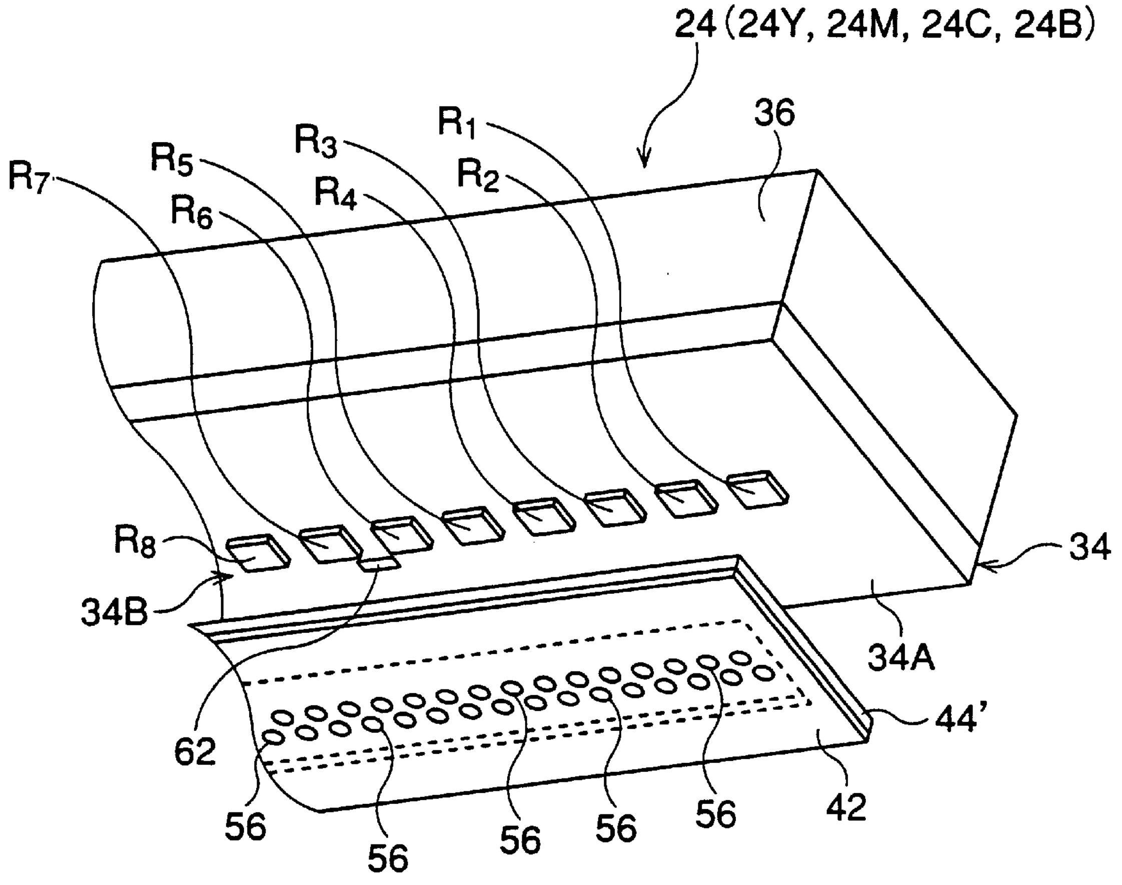
FIG. 13 is a schematic perspective exploded view, similar to FIG. 3, showing a modification of the ink transfer printer unit according to the present invention.
Figure 14:
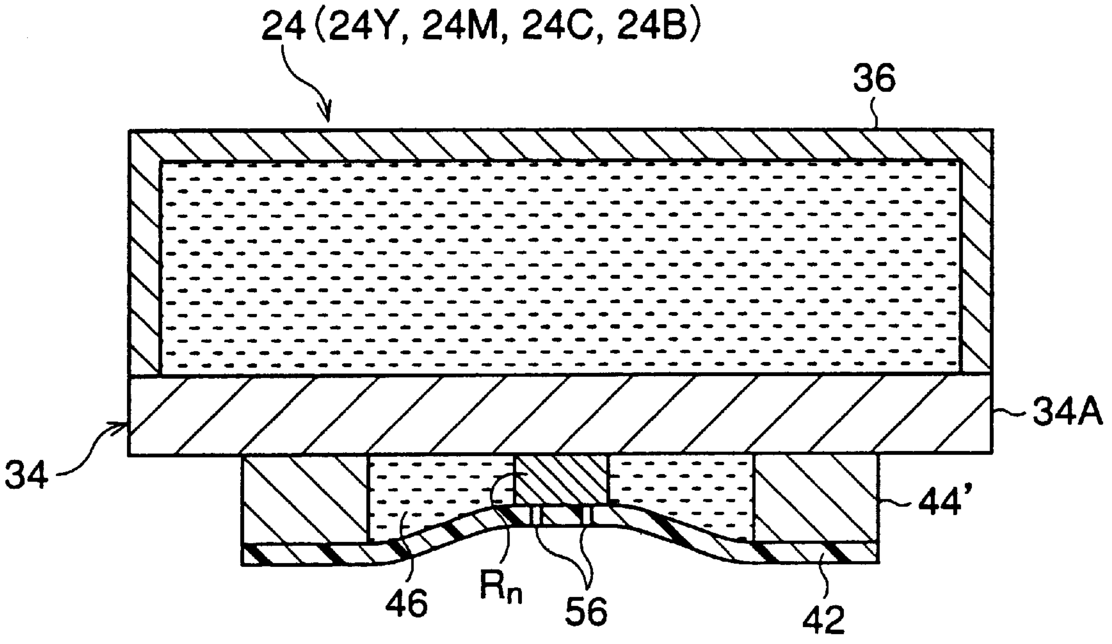
FIG. 14 is a schematic cross-sectional view of the modified ink transfer printer unit of FIG. 13.

FIGS. 13 and 14 show a modification of the ink transfer printer unit 24 shown in FIGS. 2 to 4. In FIGS. 13 and 14, the features similar to those of FIGS. 2 to 4 are indicated by the same references.

In this modified embodiment of the printer unit 24, the elongated rectangular frame member 38 is omitted, and a heat dissipating conductor 44' is substituted for the heat dissipating sheet 44. The heat dissipating conductor 44' may be also formed as a suitable metal sheet, such as an aluminum sheet, a copper sheet, or the like, having a thickness larger than that of the dissipating sheet 44 shown in FIG. 3, and thus is able to serve as both the elongated rectangular frame member (38) and the heat dissipating sheet (44). Of course, it is possible to control an electrical energization of the heat dissipating conductor or sheet 44' in substantially the same manner as mentioned above.

Note, in FIG. 13, although an ink supply pipe (54) is not illustrated, an ink space (46) is fed and filled with an ink from an ink container 36 in the same manner as in the first embodiment shown in FIGS. 2 to 4.

Figure 15:
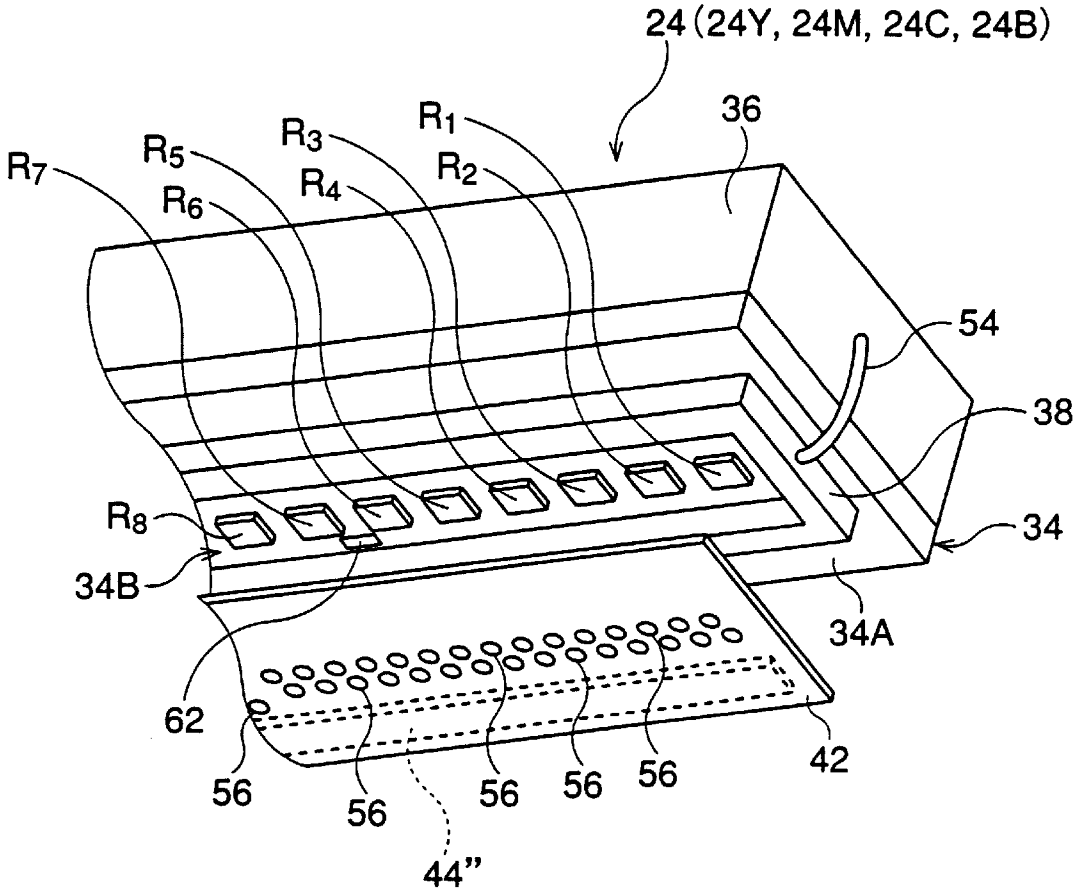
FIG. 15 is a schematic perspective exploded view, similar to FIG. 3, showing another modification of the ink transfer printer unit according to the present invention.
Figure 16:
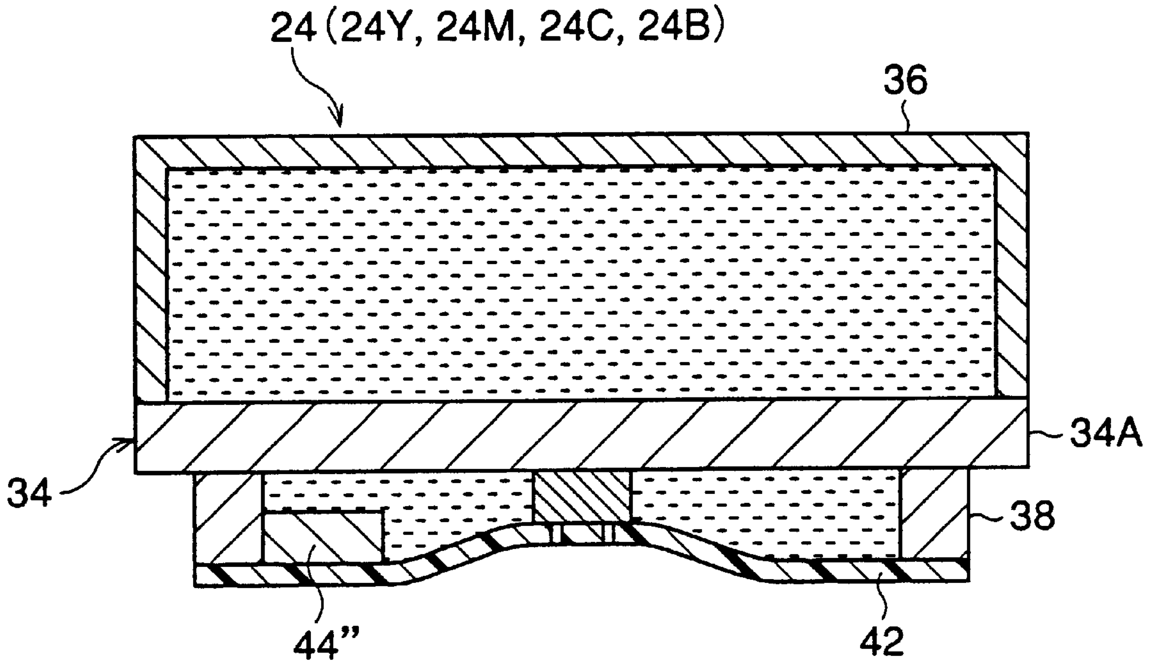
FIG. 16 is a schematic cross-sectional view of the modified ink transfer printer unit of FIG. 15.

FIGS. 15 and 16 show another modification of the ink transfer printer unit 24 shown in FIGS. 2 to 4. In FIGS. 15 and 16, the features similar to those of FIGS. 2 to 4 are indicated by the same references.

In this modified embodiment of the printer unit 24, the heat dissipating sheet 44 is omitted, and a heat dissipating conductor 44" is substituted for the heat dissipating sheet 44. Similarly, the heat dissipating conductor 44" may be formed of a suitable metal material, such as aluminum, copper, or the like, and is shaped into a strip-like element. As shown in FIGS. 15 and 16, the heat dissipating conductor or strip 44" is suitably adhered to the film sheet 42. Of course, it is possible to control an electrical energization of the heat dissipating strip 44" in substantially the same manner as mentioned above.

Finally, it will be understood by those skilled in the art that the foregoing description is of preferred embodiments of the printer, and that various changes and modifications may be made to the present invention without departing from the spirit and scope thereof.

The present disclosure relates to a subject matter contained in Japanese Patent Application No. 9-347128 (filed on Dec. 2, 1997) which is expressly incorporated herein, by reference, in is entireties.

What is claimed is:

1. An ink transfer printer comprising:

an electrically-insulated base member;

an array of electric heater elements provided on a surface of said base member and aligned with each other, said electric heater elements being selectively and electrically energized in accordance with a series of digital image-pixel signals;

a frame member, having an opening, securely provided on said base member such that said array of electric heater elements is encompassed by said opening of said frame member;

a sheet of film that covers said frame member such that said opening of said frame member defines an ink space fillable with ink, said film sheet including a plurality of fine pores arranged along said array of electric heater elements; and a heat dissipating sheet, having an opening and formed of a thermal conductive material, that is associated with said film sheet such that thermal energy, locally generated by an electrical energization of at least one of said electric heater elements, is dissipated, said heat dissipating sheet being interposed between said frame member and said film sheet such that said plurality of fine pores is encompassed by said opening of said heat dissipating sheet.

2. An ink transfer printer comprising:

an electrically-insulated base member;

an array of electric heater elements provided on a surface of said base member and aligned with each other, said electric heater elements being selectively and electrically energized in accordance with a series of digital image-pixel signals;

a frame member, having an opening, securely provided on said base member such that said array of electric heater elements is encompassed by said opening of said frame member;

a sheet of film that covers said frame member such that said opening of said frame member defines an ink space fillable with ink, said film sheet including a plurality of fine pores arranged along said array of electric heater elements; and a heat dissipating strip formed of a thermal conductive material, that is associated with said film sheet such that thermal energy, locally generated by an electrical energization of at least one of said electric heater elements, is dissipated, said heat dissipating strip attached to an inner surface of said film sheet in said ink space.

3. An ink transfer printer comprising:

an electrically-insulated base member;

an array of electric heater elements provided on a surface of said base member and aligned with each other, said electric heater elements being selectively and electrically energized in accordance with a series of digital image-pixel signals;

a frame member, having an opening, securely provided on said base member such that said array of electric heater elements is encompassed by said opening of said frame member;

a sheet of film that covers said frame member such that said opening of said frame member is defined as an ink space fillable with ink, said film sheet including a plurality of fine pores arranged along said array of electric heater elements; and a heat dissipating conductor, formed of a thermal conductive material, that is associated with said film sheet such that thermal energy, locally generated by an electrical energization of at least one of said electric heater elements, is dissipated, said heat dissipating conductor exhibiting an electrical conductivity such that said film sheet is heatable by electrically energizing said heat dissipating conductor.

4. An ink transfer printer as set forth in claim 3, further comprising a control system that controls said electrical energization of said heat dissipating conductor such that a temperature of said film sheet is kept constant.

5. An ink transfer printer as set forth in claim 4, further comprising an interrupting system that interrupts said electrical energization of said heat dissipating conductor over a predetermined period of time after said electrical energization of at least one of said electric heater elements ends.

6. An ink transfer printer comprising:

an electrically-insulated base member;

an array of electric heater elements provided on a surface of said base member and aligned with each other, said electric heater elements being selectively and electrically energized in accordance with a series of digital image-pixel signals;

a thermal conductive frame member, having an opening, securely provided on said base member such that said array of electric heater elements is encompassed by said opening of said frame member; and a sheet of film that covers said thermal conductive frame member such that said opening of said thermal conductive frame member defines an ink space fillable with ink, said film sheet including a plurality of fine pores arranged along said array of electric heater elements, wherein said thermal conductive frame member exhibits an electrical conductivity such that said film sheet is heatable by electrically energizing said thermal conductive frame member.

7. An ink transfer printer as set forth in claim 6, further comprising a control system that controls said electrical energization of said thermal conductive frame member such that a temperature of said film sheet is kept constant.

8. An ink transfer printer as set forth in claim 7, further comprising an interrupting system that interrupts said electrical energization of said thermal conductive frame member over a predetermined period of time after completing said electrical energization of at least one of said electric heater elements.

* * * * *